Jan. 30, 1940. J. B. ALFS 2,188,522
ENSILAGE CUTTER
Original Filed Dec. 16, 1936  4 Sheets—Sheet 3
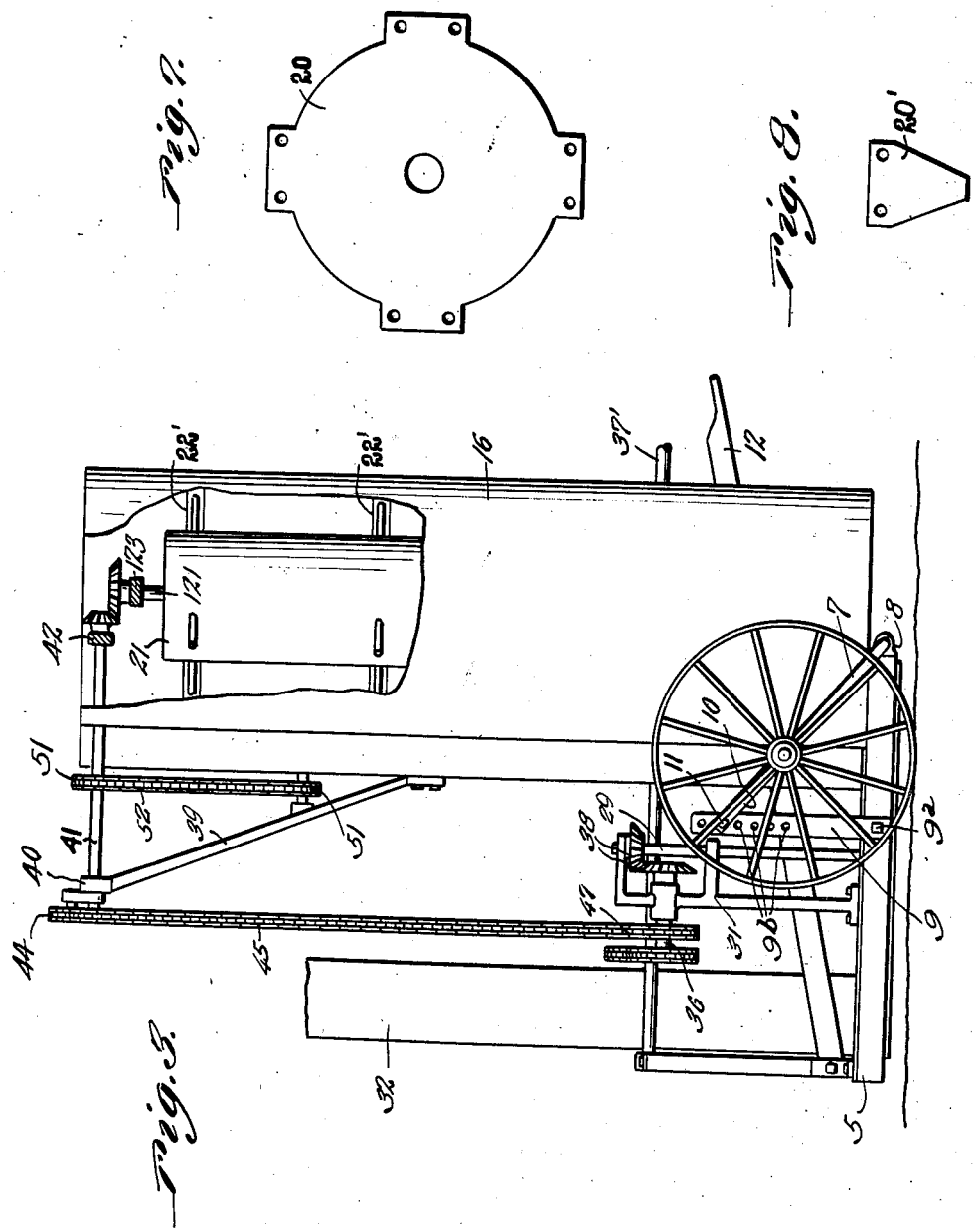
Inventor
John B. Alfs
By Clarence A. O'Brien
Hyman Berman
Attorneys

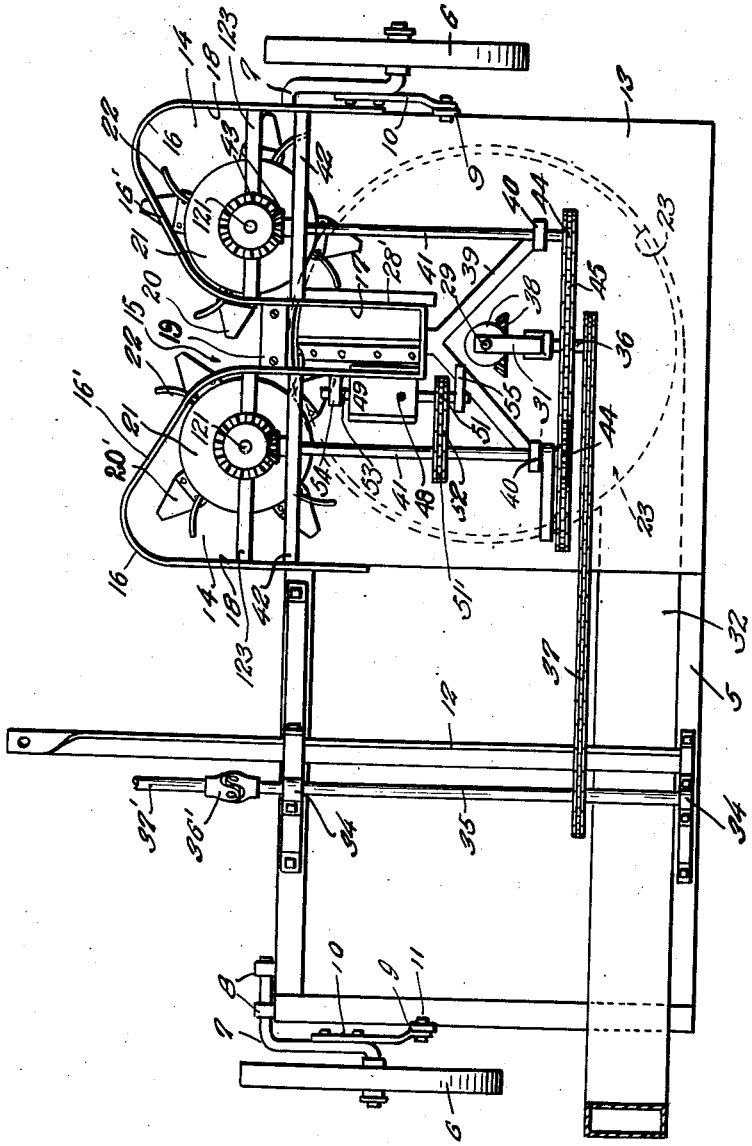

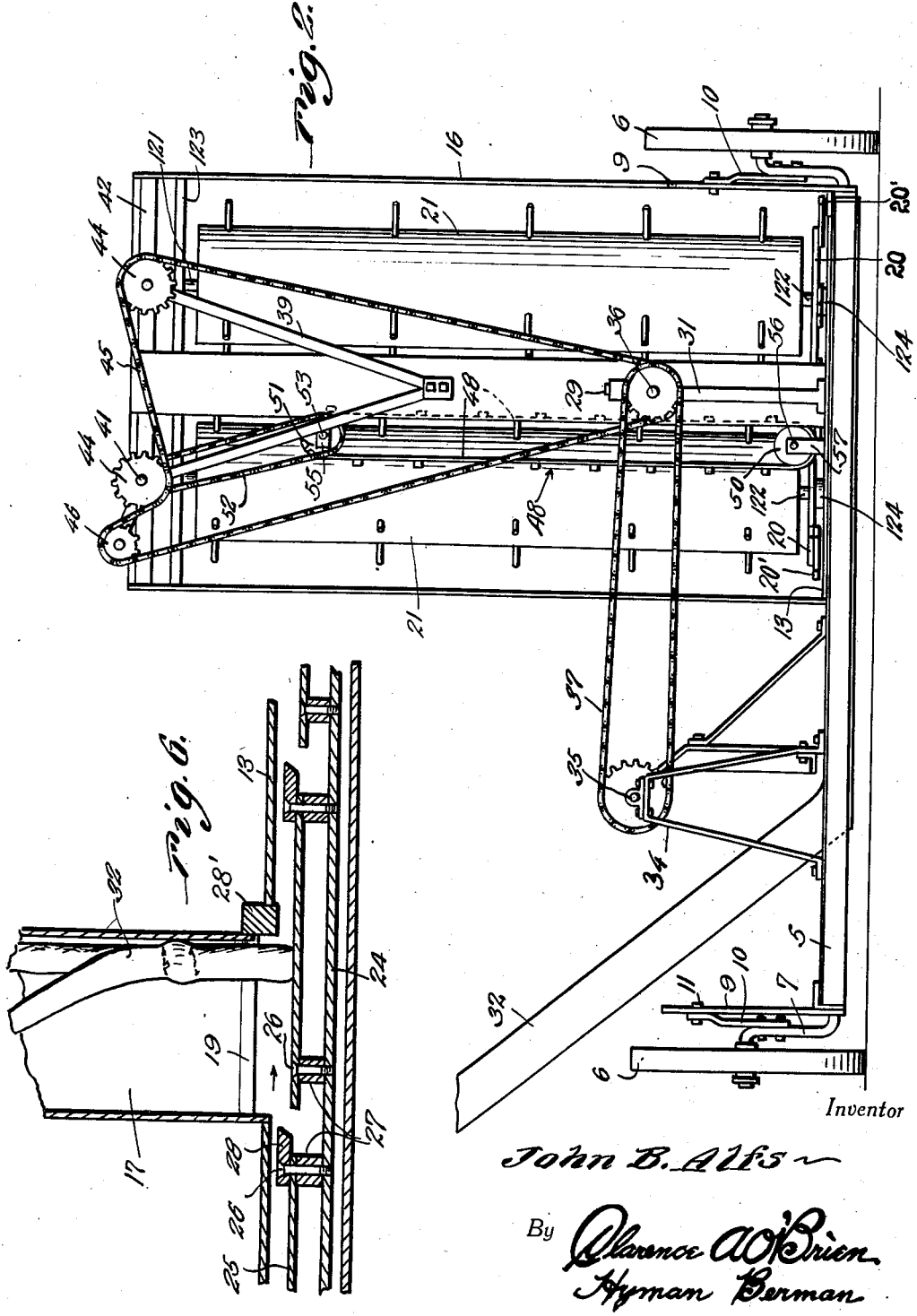

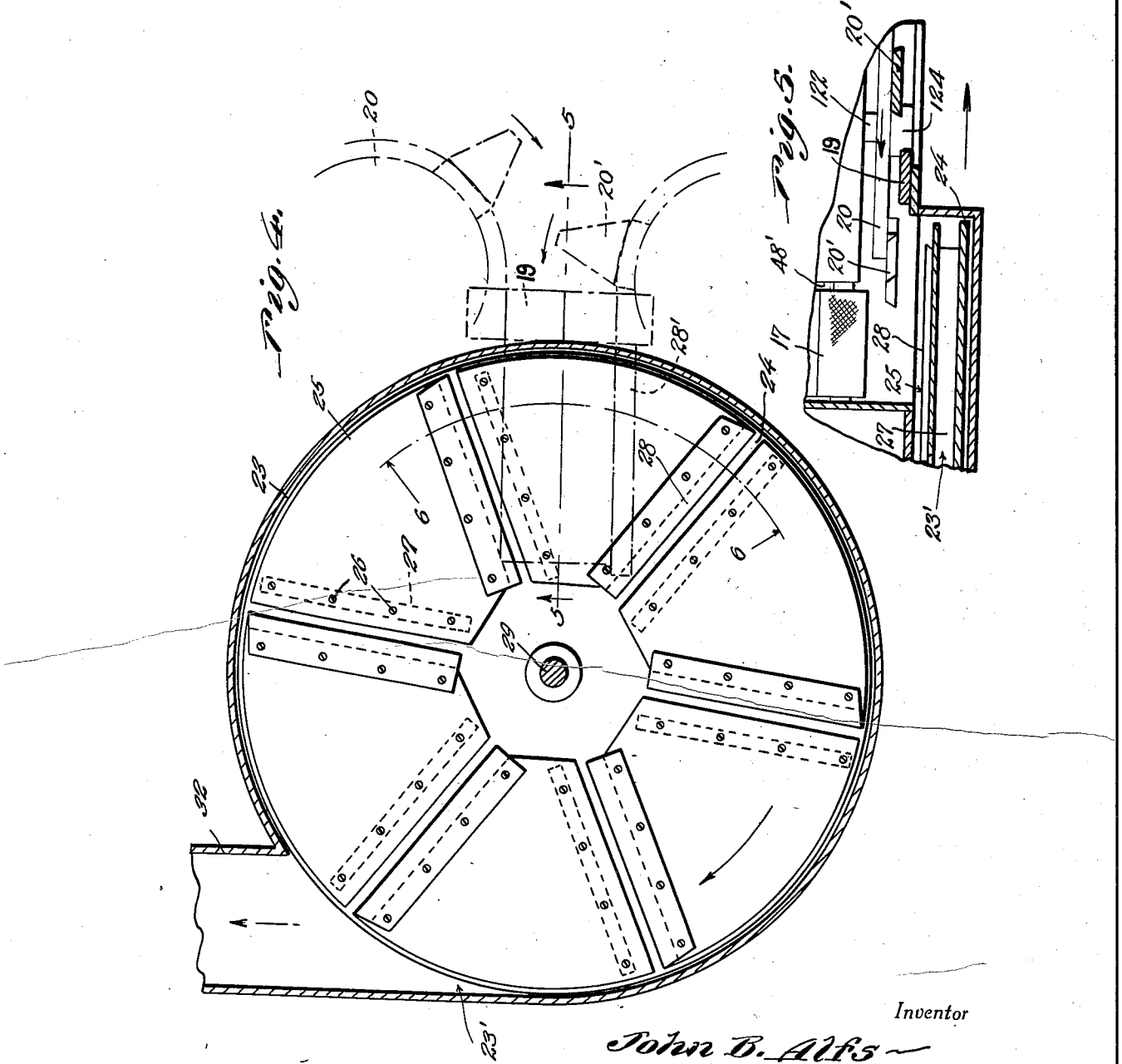

Patented Jan. 30, 1940

2,188,522

UNITED STATES PATENT OFFICE 2,188,522

ENSILAGE CUTTER

John B. Alfs, Shickley, Nebr.

Application December 16, 1936, Serial No. 116,182
Renewed August 18, 1938

20 Claims. (Cl. 56—60)

This invention relates to ensilage cutters or harvesters, and an object of the invention is to provide an ensilage cutter which will cut the corn stalks, chop the stalks into small particles, and deliver the particles to a wagon, box or the like.

An object of the invention is to provide an ensilage cutter characterized as above, and which may be readily attached to a tractor or the like. A further object relates to the provision of an ensilage cutter of simple, rugged design having a minimum of parts and therefore a related and more specific object has to do with providing an ensilage cutter wherein the corn stalks, upon being severed, pass directly to a chopping knife located adjacent the severing apparatus, without the necessity for elevating or turning the stalks into a different position or inclination before they are chopped. By providing a rotary cutter, comprising horizontally disposed radially extending blades, immediately behind and substantially on the same horizontal level with the severing blades, the stalks need be moved rearwardly but a few inches and then fed straight downwardly into the cutter, thus eliminating the elevating and conveying mechanism known in the prior art as well as the conventional mechanism for swinging the stalks into a horizontal position.

The invention together with its objects and advantages will be best understood from a study of the following description taken in connection with the accompanying drawings wherein:

Figure 1 is a top plan view of the improved cutter.

Figure 2 is a rear elevational view thereof.

Figure 3 is a side elevational view with certain parts broken away.

Figure 4 is a fragmentary horizontal sectional view showing the severing and chopping knife mechanisms.

Figure 5 is a detail sectional elevational view taken substantially on the line 5—5 of Figure 4.

Figure 6 is a fragmentary detail sectional elevational view taken substantially along an arc 6—6 in Figure 4 and illustrating the action of the chopping mechanism.

Fig. 7 is a plan view of one of the plates for the rotary knives and Fig. 8 is a detail of one of the knife blades.

Referring to the drawings by reference numerals it will be seen that in the preferred embodiment thereof the improved ensilage cutter comprises a platform 5 in the form of an oblong frame disposed generally transverse to the line of advance and supported at its respective opposite ends through the medium of wheels 6.

Wheels 6 are journaled on the ends of substantially S-shaped axles 7 that at one end are journaled at the forward side of the platform 5 in bearing brackets 8 mounted on the platform adjacent the respective opposite ends of the platform.

Rising from the platform 5 at its respective opposite ends and swingably connected thereto by bolts 9a are vertical bars 9 while straps 10 are rigidly secured to intermediate portions of the axle 7.

The bars 9 are provided with vertically spaced openings 9b while the free ends of the straps 10 are provided with openings to register with selected openings in the bars 9 to accommodate bolts or the like 11 whereby the platform 5 is secured at the desired elevation relative to the ground.

Adjacent one side thereof, the platform 5 has secured thereto a draft tongue 12 through the medium of which the ensilage cutter is hitched to a tractor or the like.

Mounted on the platform 5 adjacent one end thereof, is a plate 13 of metal or other suitable material which projects forwardly of the platform 5 and at said forward end is formed with forwardly projecting extensions 14 disposed on opposite sides of a fore and aft extending slot 15, the inner edges of the extensions 14 diverging forwardly from the forward portion of the slot.

Rising from the plate 13 along the outer edges of the plate and the inner edges of the extensions 14 is a vertical wall 16 which defines, in substantial alignment with the entrance slot 15 a stalk passageway 17 and compartments or chambers 18 at opposite sides of the passage 17. The implement is drawn forwardly in operation with the entrance slot 15 and the stalk accommodating space 17 centered on a row of standing corn. The forwardly diverging portions 16' of the wall 16 serve to guide any laterally bent or leaning stalks into the passage 17. The stalks are urged into the passage 17 and the lower ends of the stalks are urged against the cutter bar 19 by a pair of vertically disposed gathering drums 21, which are positioned behind the inwardly converging walls 16' on opposite sides, respectively, of the space 17. Each of the drums 21 is provided with upper and lower bearing spindles 121, 122 upon which the drums are adapted to rotate about vertical axes. The upper spindles 121 are journaled in bearings in bracket members 123 extending between opposed portions of the wall 16, while the lower spindles 122 are journaled in bearings 124 mounted on the lower plate 13. The drums 21 are adapted to be rotated in relatively opposite directions as indicated by arrows in Figure 1, for urging the stalks into the machine.

The drums 21 are provided with gathering fingers 22 that work through suitable elongated slots 22' provided in the adjacent sections of the wall 16 in a manner to engage the stalks and feed them inwardly of the passage 17. A pair of rotary severing members comprising a supporting plate 20 and a plurality of stalk-severing knife blades 20' fixed thereto, are fixed to the lower spindles 122 of the gathering drums 21, respectively, for rotation therewith. As indicated in Figures 1 and 7, there are preferably four blades 20' on each plate 20, spaced 90° apart. The blades are positioned to cooperate in cutting relation with a stationary cutter bar 19 for severing the stalks, as best illustrated in Figures 4 and 5. The stationary bar 19 is disposed transversely across the slot 15 and is fixed to the plate 13. As the stalks are gathered into the space 17 by the drums 21, they are severed at the base by the action of the blades 20' against the bar 19. The drums are driven in synchronism in order that the blades 20' on one of the drums alternate with the blades of the other drum in passing over the cutter bar 19.

For cutting the severed stalks into small pieces there is suitably provided beneath the plate 13 a substantially circular compartment 23 in which is mounted a rotary cutter 23' comprising a horizontal circular plate 24, disposed for rotation in a horizontal plane and on which is mounted a series of segmental plates 25 which are secured by screws or other suitable fastening elements 26 to radially extending cleats 27 arranged in pairs and in a circular series on the revolving plate 24.

Suitably secured to the plate segments 25 at the leading edges of the segments are knives 28.

The plate 24 is secured to the lower end of a vertical shaft 29 that extends from the center of the plate 24 upwardly through the plate 13 and is journaled in the bearings of a suitable bracket 31. (See Figures 3 and 4.)

The cutter 23' is so disposed that as the knives 28 are rotated through the stalk passage 17, they pass directly behind the stationary cutter bar 19 in a plane substantially on the same level as the cutter bar, or slightly below the bar to provide clearance for the stalk severing blades 20' to pass thereover, as indicated in Figure 5. After the stalks have been severed at the cutter bar 19, they are urged into the passage 17 and fall butt downward upon the rotary cutter 23' into which they are fed or crowded downwardly by means to be described later, the radial knives coacting with a fore and aft extending stationary cutter bar 28' fixed to the plate 13, to cut or chop the corn into small pieces, as indicated in Figure 6.

It will be understood that the plate 24 and associated parts will revolve at a relatively high speed, setting up a strong draft of air, with the result that these severed small pieces of the stalks will be thrown by centrifugal force out of compartment 23 and carried by the draft of air through an outlet tube 32 to discharge into a wagon, truck or the like provided for receiving the cut pieces. Further, in accordance with the present invention there is suitably mounted on the platform 5 bearing brackets 34 in which are journaled the ends of a shaft 35. At one end shaft 35 is adapted to be coupled as at 36' with a power take-off shaft 37' extending from the tractor or other draft vehicle (not shown).

The aforementioned bearing bracket 31 is provided with a bearing in which is journaled a stub shaft 36 which is driven from the shaft 35 through the medium of a chain and sprocket mechanism 37.

Drive from the shaft 36 is transmitted to the shaft 29 through the medium of gearing 38 for revolving the disc 24 and knives 28 therewith.

Suitably mounted on the inner closed end of the passage 17 is a substantially Y-shaped bracket 39 provided with bearings 40 in which are journaled one end of shafts 41. Shafts 41 are also journaled in suitable bearing brackets 42 mounted between opposed portions of the wall member 16 and drive from the shafts 41 is transmitted to the drums 21 and knives 20' through the medium of gearing 43.

The shafts 41 are also provided with sprockets 44 over which is trained, as shown in Figure 2, a sprocket chain 45 which latter is also trained over a suitably mounted idler sprocket 46 and a sprocket 47 mounted on the shaft 36. Thus it will be seen that drive will be transmitted from the shaft 36 to the drums 21 for rotating the drums in reverse directions relative to one another so that the fingers of the drums will act on the corn stalks for forcing the same inwardly of the passage 17.

A crowding device 48 in the form of an endless cleated belt trained over upper and lower pulleys 49, 50 is provided and has one run thereof working through a vertical slot 48' in the shield 16 at one side of the passage 17 so that the cleats will engage with the stalks 32 for urging the latter downwardly to the end that the lower ends of the stalks will be cut by the knives 28. The upper pulley 49 is mounted on a shaft 53 which is carried at opposite ends thereof in a bracket 54 fixed to the housing wall 16, and a bracket 55 attached to the Y-shaped bracket 39, respectively. The lower pulley 50 is mounted on a shaft 56 carried in bearings 57 which are mounted on the base plate 13.

For driving the crowding device 48 there is provided on the shaft 53 of the upper pulley 49 a sprocket 51 over which is trained a sprocket chain 52 that is also trained over a sprocket 51' provided on the adjacent shaft 41 as will be clear from a study of Figures 1 and 2. Thus it will be seen that drive will be transmitted from said one shaft 41 to the shaft of the pulley 49 for operating the crowding device 48.

Since the operation of the ensilage cutter was described in connection with the detailed description of the structural features of the cutter, it is thought that a clear understanding of the construction, utility and advantages of an invention of this character will be had without a more detailed description.

Having thus described the invention, what is claimed as new is:

1. An ensilage cutter comprising a wheel supported platform, a shield rising vertically from said platform adjacent one end of the latter and having a shape in top plan presenting a pair of casings and a passage between said casings and closed at its inner end, drums rotatably mounted vertically within said casings and having stalk gathering fingers projecting radially therefrom and working through slots in the wall structure, a stationary cutter bar mounted on the platform across the entrance end of said passage and cutters below the drums and rotatably connected thereto for cutting the standing stalks from the field, and mechanism for actuating said drums and cutters.

2. An ensilage cutter comprising a wheel supported platform, a shield rising vertically from said platform adjacent one end of the latter and having a shape in top plan presenting a pair of casings and a passage between said casings and closed at its inner end, drums rotatably mounted vertically within said casings and having stalk gathering fingers projecting radially therefrom and working through slots in the wall structure, a stationary cutter bar mounted on the platform across the entrance end of said passage and cutters below the drums and rotatably connected thereto for cutting the standing stalks from the field, mechanism for actuating said drums and cutters, a substantially circular casing mounted on said platform, a plate revolvably mounted in said casing, a series of segmental plates arranged in a circular manner on said revolvable plate and spaced from said circular plate and cutting knives on the leading edges of said segmental plates for cutting the lower ends of the stalks into small pieces, and a conduit tube extending tangentially from said casing for conducting the cut pieces of stalks away from said casing, and a crowding device in the form of an endless belt trained over upper and lower pulleys mounted at one side of the passage way and having one run of said belt working through slots on the wall structure to engage the cut stalks for urging the stalks into engagement with said cutting knives.

3. In an implement of the class described, means for severing stalks from the field, and rotary chopping means comprising a horizontally disposed knife blade mounted for rotation in a horizontal plane immediately behind said severing means.

4. In an implement of the class described, a cutter bar disposed transversely of the line of advance of the implement, a severing knife coacting with said bar to sever stalks from the field, and chopping means comprising a horizontally disposed knife blade rotatable in a generally horizontal plane, disposed rearward of said cutter bar and at substantially the same level therewith.

5. In an implement of the class described, a cutter bar disposed transversely of the line of advance of the implement, a severing knife coacting with said bar to sever stalks from the field, and a rotary chopper comprising a horizontally disposed knife blade disposed for rotation in a horizontal plane immediately behind and at substantially the same level with said cutter bar.

6. In an implement of the class described, acting with said bar to sever stalks from the wheel supported frame, a rotary chopper comprising a supporting plate mounted thereon for rotation in a substantially horizontal plane, radially extending cutting blades carried by said plate, a cutter bar fixedly mounted on said frame adjacent to said chopper, and stalk severing blade means cooperative with said cutter bar and mounted on said frame by means providing for movement across said cutter bar and over said chopping blades, whereby said severing blade tends to urge the severed stalks toward said chopping blades.

7. In an implement of the class described, a wheel supported frame, walls defining a stalk receiving passage supported on said frame, said passage extending generally fore and aft and having a stalk receiving opening at the forward end thereof, a cutter bar disposed transversely of said passage near the forward end thereof and fixed to said frame, a rotatable gathering device comprising a member disposed on said frame adjacent to said cutter bar and rotatable about a substantially vertical axis, a series of generally radially extending gathering fingers supported on said member for engaging the stalks for urging them into said passage, and a plurality of severing knife blades extending generally radially of said member near the lower end thereof and attached thereto, said blades being adapted to coact with said cutter bar to sever said stalks from the field.

8. An ensilage harvester comprising a wheel supported frame, upright walls defining a stalk receiving passage supported on said frame, said passage extending generally fore and aft and having a stalk receiving opening at the forward end thereof, a rotary chopper disposed below said passage, a cutter bar fixed to said frame and disposed transversely of said passage adjacent said chopper, and a rotatable severing knife mounted on said frame and having blades movable over said cutter bar and said chopper and coacting with said cutter bar to sever the stalks from the field and tending to urge said stalks through said passage to a position in register with said chopper.

9. An ensilage harvester comprising a wheel supported frame, a rotary chopper supported on said frame in close proximity to the ground, stalk gathering means comprising a vertically disposed drum mounted adjacent to said chopper for rotation about a vertical axis, said drum having members projecting outwardly therefrom and passing over said chopper during operation for engaging the stalks and urging them toward the chopper, and severing means disposed adjacent to said chopper for severing said stalks from the field.

10. An ensilage harvester comprising a wheel supported frame, stalk chopping means including a plurality of knife blades mounted on said frame for rotation in a horizontal plane, means for severing stalks from the field disposed adjacent said chopping means, and a pair of laterally spaced gathering drums mounted on said frame adjacent to said chopping means for rotation about vertical axes, said drums having projections extending outwardly therefrom and engageable with the stalks for urging the latter toward said severing and said chopping means.

11. An ensilage harvester comprising a wheel supported frame, a rotary chopper including a plurality of radially extending horizontally disposed chopping blades rotatable about a vertical axis, means for severing stalks from the ground including a transversely disposed cutter bar mounted on said frame adjacent to said rotary chopper and substantially at the same level thereof and a severing blade cooperable with said bar, and a pair of laterally spaced gathering drums mounted on said frame adjacent to said chopper substantially in transverse alignment with said cutter bar, said drums having projections extending outwardly therefrom and engageable with said stalks for urging the latter between the drums against said cutter bar and to a position above said rotary chopper.

12. In an ensilage harvester, a rotary chopper including a plurality of radially extending horizontally disposed chopping blades rotatable about a vertical axis, means for severing stalks from the ground, means for urging said stalks to a position above said blades, and means including a vertically traveling endless belt for feeding said stalks downwardly into said chopper.

13. In an ensilage harvester, a frame, a rotary chopper including a plurality of horizontally disposed knife blades rotatably mounted on said frame, a cutter bar fixed to said frame adjacent to and at substantially the same level as the chopper, gathering means including a drum rotatably disposed adjacent to said cutter bar and having outwardly extending projections for engaging stalks and urging them against the cutter bar, said drum being positioned so that said projections move over said chopper during rotation for urging said stalks to a position directly above said chopper, and means for feeding the stalks downwardly into the chopper.

14. An ensilage harvester comprising a wheel supported frame, a rotary chopper including a plurality of radially extending horizontally disposed chopping blades rotatable about a vertical axis, means for severing stalks from the ground including a transversely disposed cutter bar mounted on said frame adjacent to said rotary chopper and substantially at the same level thereof and a severing blade cooperable with said bar, and a pair of laterally spaced gathering drums mounted on said frame adjacent to said chopper substantially in transverse alignment with said cutter bar, said drums having projections extending outwardly therefrom and engageable with said stalks for urging the latter between the drums against said cutter bar and to a position above said rotary chopper, and means engageable with said stalks for urging them downwardly into said cutter.

15. An ensilage harvester comprising a wheel supported frame, upright walls defining a stalk receiving passage supported on said frame, said passage extending generally fore and aft and having a stalk receiving opening at the forward end thereof, a rotary chopper disposed below said passage, a cutter bar fixed to said frame and disposed transversely of said passage adjacent said chopper, and severing knife blades movable over said cutter bar and said chopper and coacting with said cutter bar to sever the stalks form the field and tending to urge said stalks through said passage to a position in register with said chopper, and means engageable with said stalks for urging them downwardly into said cutter.

16. An ensilage harvester comprising a wheel supported frame, a rotary chopper supported on said frame in close proximity to the ground, said chopper comprising a plurality of horizontally disposed generally radially extending blades, a stalk severing cutter bar supported on said frame in front of said rotary chopper and slightly higher than the latter, and means for moving severed stalks rearwardly off said cutter bar into said chopper, whereby the stalks are fed downwardly while in a vertical position.

17. An ensilage harvester comprising a wheel supported frame, a rotary chopper supported on said frame in close proximity to the ground, said chopper comprising a plurality of horizontally disposed generally radially extending blades, a stalk severing cutter bar supported on said frame in front of said rotary chopper and slightly higher than the latter, means for moving severed stalks rearwardly off said cutter bar, and means for urging the stalks downwardly in a vertical position into said chopper.

18. An ensilage harvester comprising a wheel supported frame, a housing supported on said frame near the ground, a rotary chopper disposed in said housing comprising at least one generally horizontal blade mounted for rotation about a generally vertical axis, a stalk receiving aperture in the top of said housing, a stalk severing cutter bar supported adjacent the forward edge of said aperture, and means for moving severed stalks rearwardly off said cutter bar into said aperture, whereby said stalks are fed, at least partially by gravity, into said chopper in a vertical position.

19. An ensilage harvester comprising a wheel supported frame, a housing supported on said frame near the ground, a rotary chopper disposed in said housing comprising at least one generally horizontal blade mounted for rotation about a generally vertical axis, a stalk receiving aperture in the top of said housing, a stalk severing cutter bar supported adjacent the forward edge of said aperture, and a rotary severing knife mounted for rotation adjacent said cutter bar about a vertical axis, said knife including at least one horizontally disposed blade adapted to cooperate with said cutter bar to sever stalks from the field and move the severed stalks rearwardly off the cutter bar into said aperture.

20. An ensilage harvester comprising a wheel supported frame, a housing supported on said frame near the ground, a rotary chopper disposed in said housing comprising at least one generally horizontal blade mounted for rotation about a generally vertical axis, a stalk receiving aperture in the top of said housing, a stalk severing cutter bar supported adjacent the forward edge of said aperture, a rotary severing knife mounted for rotation adjacent said cutter bar about a vertical axis, said knife including at least one horizontally disposed blade adapted to cooperate with said cutter bar to sever stalks from the field and move the severed stalks rearwardly off the cutter bar into said aperture, and means engaging said stalks for forcing them downwardly through said aperture into said chopper.

JOHN B. ALFS.